United States Patent [19]
Hirata et al.
[11] 3,800,942
[45] Apr. 2, 1974

[54] INFORMATION CARD RETRIEVAL DEVICE

[75] Inventors: Junichi Hirata; Seiichi Hayashi, both of Hitachi; Kazuo Sakai, Tokyo, all of Japan

[73] Assignee: Hitachi, Ltd., Tokyo, Japan

[22] Filed: Apr. 11, 1973

[21] Appl. No.: 349,956

[30] Foreign Application Priority Data
Apr. 14, 1972 Japan .............................. 47-36927

[52] U.S. Cl. ............... 209/80.5, 209/111.8, 353/25
[51] Int. Cl. ............................................ B07c 3/10
[58] Field of Search ............ 209/80.5, 111.8, 110.5; 353/25, 26, 27

[56] References Cited
UNITED STATES PATENTS
3,631,978 1/1972 Hagan .............................. 209/80.5
3,731,060 5/1973 Weinstein ...................... 209/80.5 X Primary Examiner—Richard A. Schacher
Attorney, Agent, or Firm—Craig and Antonelli

[57] ABSTRACT

An information card retrieval device comprising a multiplicity of jackets each for containing an information card carrying picture information, a plurality of magazines each for containing a plurality of such jackets, a drum for supporting said plurality of magazines in juxtaposition, and a means for transporting the magazines on the drum at random to a selector means thereby to accomplish the retrieval of a desired information card from a desired magazine transported to the selector means.

4 Claims, 5 Drawing Figures

PATENTED APR 2 1974 3,800,942

SHEET 1 OF 3

INFORMATION CARD RETRIEVAL DEVICE

BACKGROUND OF THE INVENTION

1. Field of the Invention

The present invention relates to an information card retrieval device for retrieving a desired information card from a means storing information cards each carrying picture information.

For ease in terminology in describing the present invention, the items to be stored will be referred to generally in this specification as "information cards," which term is intended to cover many different items including, without limitation, ledger cards, magnetic cards, optical cards, punched cards, tapes, keys, slides, film cards, microfiche, microfilm jackets, and the like. 2. Description of the Prior Art In one of the conventional devices for retrieving one of the many information cards carrying picture information stored in juxtaposition in a storage means, a multiplicity of microfiches each having a search code section of magnetic material at an end thereof are stored in the storage means, which is moved transversely relative to a selector means for selecting an appropriate search code thereby to select a desired information card, while at the same time moving the selected information card slightly forwardly by means of the magnetic material. When the particular information card reaches a delivery station or other predetermined position, the relative transverse movement of the storage means is terminated, so that the particular information card is separated from another information cards adjacent thereto by a pair of wedge-shaped hooks. At the same time, the information card moved forwardly is taken out by an X-Y handling means and transported to a predetermined position.

Such a conventional device requires for different search codes to be provided for a multiplicity of information cards stored in a storage means, with the result that the dimensional limitations accompanying the information cards makes it very difficult and costly to produce different search codes. Especially in the case where the magnetic material is fixed directly on an information card and a search code is applied to the magnetic material, great difficulties are encountered in forming notches for search codes.

One method of facilitating the process of forming the code notches may be to allow the search codes to be located at relatively free positions on the information cards. However, since this method makes it necessary to reduce the number of information cards capable of being selected at a time, it is impossible to store a great number of information cards. Another disadvantage of such a method is the fact that since a search code is directly provided on an information card, it is impossible to interchangeably use such search codes with those information cards without any search codes provided thereon. In other words, in such a conventional device, information cards other than those produced exclusively for a particular device can not be used. Also, in the retrieval and returning of an information card, it is necessary to provide means for separating the desired information card from cards adjacent thereto, resulting in the complication of the construction of the device on one hand and the problem of scratches which tend to develop on the information card in the process of retrieval or returning. Further, since each information card contains only those images which cannot be identified with a naked eye, it is impossible to make indications which need to be identifiable with a naked eye such as titles, captions, memorandums and patterns or colorings intended for improved design.

SUMMARY OF THE INVENTION

It is an object of the invention to provide an information card retrieval device with a simple construction for retrieving information cards in which each search code for selection of an information card has a small number of digits and a desired information card is capable of being selected from among a multiplicity of information cards without causing any scratches to develop on the information card retrieved.

Another object of the invention is to provide an information card retrieval device in which the retrieval and returning of each information card is accomplished easily with a simple means.

Still another object of the invention is to provide an information card retrieval device in which it is possible to provide various indications to identify each information card with a naked eye.

A further object of the invention is to provide an information card retrieval device which has improved means for the retrieval and returning of information cards.

In order to achieve the above-mentioned objects, the present invention is characterized in that information cards are contained in jackets and a plurality of such jackets are in turn contained in each of a plurality of magazines disposed on a drum, so that by designating the address of a magazine and the search code alloted to a jacket, the magazine is transferred to a desired position to retrieve the jacket with the designated search code, while leaving part of the particular jacket within the magazine.

DESCRIPTION OF THE PREFERRED EMBODIMENTS

Figure 1:
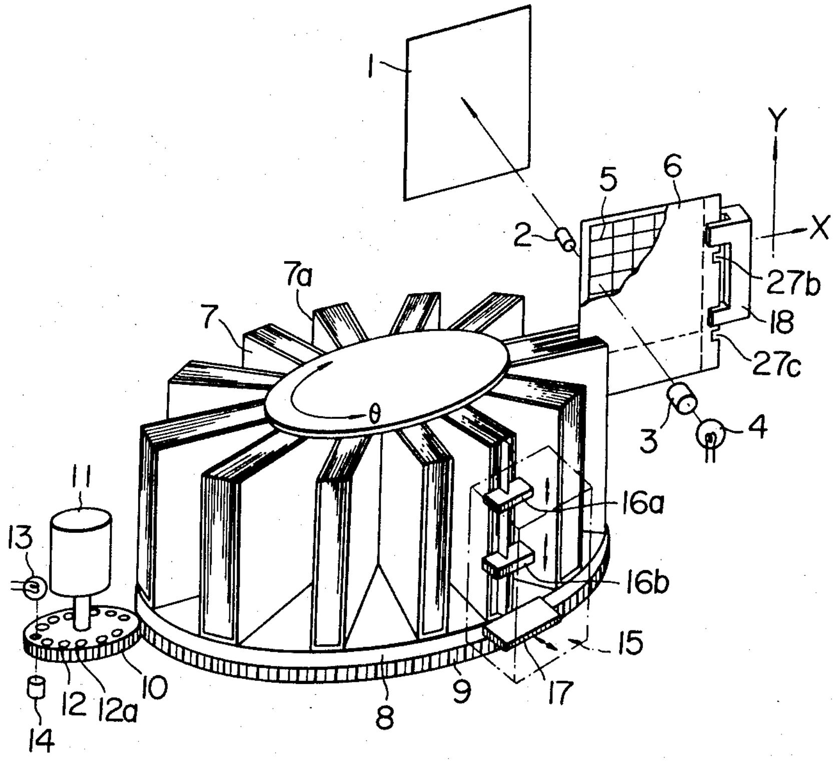
FIG. 1 is a diagram showing a perspective view of the essential parts of an embodiment of the invention.
Figure 2:
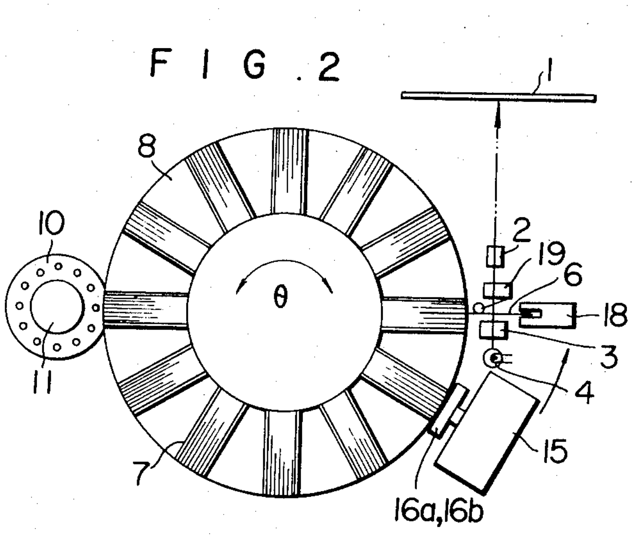
FIG. 2 is a plan as viewed from above of the embodiment of FIG. 1.
Figure 3:
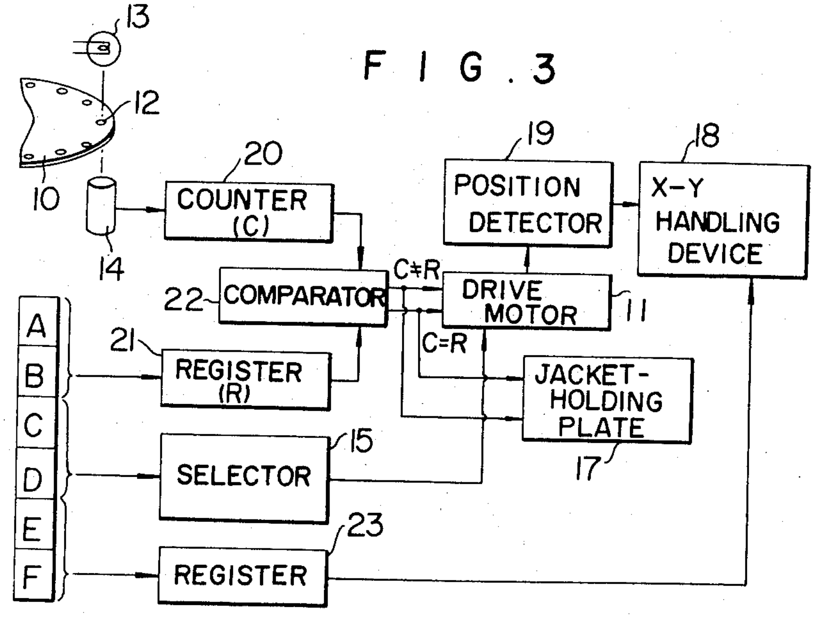
FIG. 3 is a block diagram for explaining the operation of the device according to the invention.

An embodiment of the invention will be now explained with reference to the accompanying drawings.

In the drawings, reference numeral 1 shows a screen, numeral 2 a projection lens, numeral 3 a focusing lens, numeral 4 a projection lamp and numeral 5 an information card. An optical system for projecting an enlarged image of the information contained in the information card 5 is made up of the screen 1, the projection lens 2, the focusing lens 3 and the projection lamp 4. As already mentioned above, the information card 5 includes, without limitation, a magnetic card, optical card, punched card, microfilm, microfilm jacket, tape, microfiche or the like, even though microfiche is employed in the present invention.

Reference numeral 6 shows a jacket for containing the information card 5, the jacket consisting of a transparent sheet of synthetic resin hard to scratch. Numeral 7 shows a box-type magazine with its upper and front sides open for containing replaceably a plurality of jackets (usually 20 to 30 jackets), the most effective amount of the jackets to be contained in one magazine being 30. Numeral 8 shows a drum on which are radially arranged approximately 20 magazines 7 at regular spatial intervals. The magazine 7 is constructed replaceably so as to be interchangeably used with other magazines as desired. Numeral 9 shows a gear with its teeth along the periphery of the bottom of the drum 8, the gear being in engagement with a small gear 10. Numeral 11 shows a motor for driving the drum 8 through the small gear 10. Numeral 12 shows aperture provided in the small gear 10 at regular intervals and equal in number to the magazines 7. Numeral 13 shows a light source such as a lamp whose output light is radiated through the apertures 12 onto a light-receiving section 14 such as a photoelectric element. With the rotation of the small gear 10 by the amount corresponding to the length between an aperture 12 and the next aperture 12*a*, the drum 8 rotates by the amount corresponding to the length between a magazine 7 and the next magazine 7*a*. Therefore, the aperture 12 functions as the address of the magazine 7. Numeral 15 shows a selector or search means provided in proximity to the magazines 7 on the drum 8 and comprising search magnets 16*a* and 16*b* which move to a predetermined position upon a selection command and a holding plate 17 for preventing the jacket 6 from flying off radially. Numeral 18 shows an X-Y handling device provided approximately 180° in advance of the small gear 10 on the periphery of the drum 8 for pulling out to a predetermined position the jacket 6 selected out by the selector means 15. Numeral 19 shows a position detector means for detecting the jacket 6 which has been radially taken out and reached the operating position of the X-Y handling device 18. As the position detector means may be used a microswitch a contact of which is pressed by the jacket 6 thereby to close the actuating circuit for the X-Y handling device 18.

The radiation of light through the small aperture 12 onto the light-receiving section causes one pulse to be generated from the light-receiving section. The pulse is counted by the counter section 20. The counter section 20 is reset and its content is reduced to zero without fail when the starting aperture of the small gear is reached upon completion of the counting of all the apertures. Reference numeral 21 shows a register for setting a desired magazine address, and numeral 22 a comparator section for comparing the content of the counting section 21 with that of the register 21. The comparator section 22 produces an output signal not only to stop the motor 11 but to release the holding plate 17 when the contents C of the counting section 20 agree with the contents R of the register 21. Numeral 23 shows a register for storing image addresses which indicates which image stored in the information card 5 is to be projected in an enlarged form. An output from the register 23 is applied to the X-Y handling device in the form of a command to stop the operation thereof.

Reference numerals 24*a* and 24*b* show transparent sheets constituting the jacket 6, numeral 25 a magnetic material provided at an end of the jacket 6 which is attracted to the magnets 16*a* and 16*b* thereby to pull out the jacket 6 radially of the drum 8. Numeral 26 shows an intermediate sheet for maintaining the space between the transparent sheets 24*a* and 24*b*, the sheet being integrated with the transparent sheets 24*a* and 24*b* at their ends by fusion or other bonding method. Numerals 27*a*, 27*b* and 27*c* show notches formed as search codes at the edges of the jacket 6 at the positions where the magnetic material 25 is located, the width of each of the notches being greater than the thickness of the search magnets 16*a* and 16*b*. Numerals 28*a* and 28*b* show positioning notches formed in proximity to the notches 27*a*, 27*b* and 27*c* whereby the jacket 6 is mechanically posotioned and held by the X-Y handling device 8. Numeral 29 shows a blank portion formed on the lower part of the jacket 6 for making various indications. In the case of a change in the information card 5 contained in the jacket 6, the indications are easily changed so as to meet the new situation by providing a bag for the blank portion 29 into which a separately prepared indication plate is capable of being inserted as required. Such a bag of the jacket 6 for receiving the information card 5 may be open at one side thereof.

In the above-described arrangement, the designation of the address AB of the magazine containing the jacket to be selected, search code CD of the jacket to be selected and the image address EF of the jacket 6 to be selected causes the current address of the magazine 7 stored in the selector means 15 to be compared with the address AB stored in the register 21. When they disagree with each other, the motor 11 is driven thereby to rotate the drum 8, while the agreement between them causes the motor 11 to be stopped thereby to stop the rotation of the drum 8. As a result, the magazine 7 of the designated address is stopped in front of the selector means 15.

During the rotation of the drum 8, the holding plate 17 moves toward the center of the drum 18 to prevent the jacket 6 from being attracted by the search magnets 16*a* and 16*b*. When the designated magazine 7 stops in front of the selector means 15, the jacket 7 moves back whereby the jacket 6 in the magazine is rendered free to be attracted to the search magnets 16*a* and 16*b*. In this case, the magnets 16*a* and 16*b* move to a designated position prior to the retreat of the holding plate 17. Only the jacket 6 which agrees with the notches 27*a*, 27*b* and 27*c* at the predetermined position is attracted by the search magnets 16*a* and 16*b* to jump forward by the length equal to the depth of the notches 27*a*, 27*b* and 27*c*, while the other jackets are prevented from jumping forward by the edges of the search magnets 16*a* and 16*b*.

When the desired jacket 6 jumps out, the drum 48 is again rotated and the particular jacket 6 impinges upon the position detector 19 so that the drum 8 stops rotating on one hand and the X-Y handling device 18 is energized thereby to further pull out the jacket 6 to a predetermined position. The length by which the jacket 6 is pulled out is determined by a command signal issued by the register 23, even though the jacket 6 is always partially left within the magazine 7. The image contained in the information card 5 in the jacket 6 pulled out to the predetermined position is enlarged and projected on the screen 1. After the projected image is observed, the designated address in the register 23 is reduced to zero whereby the jacket 6 is returned into the magazine 7 by means of the X-Y handling device 18.

At the same time that the desired jacket 6 jumps out and the designated magazine 7 departs from the selector means 15, the holding plate 17 moves forward toward the center of the drum 8 thereby to prevent the jackets contained in the other magazines from jumping out.

Figure 4:
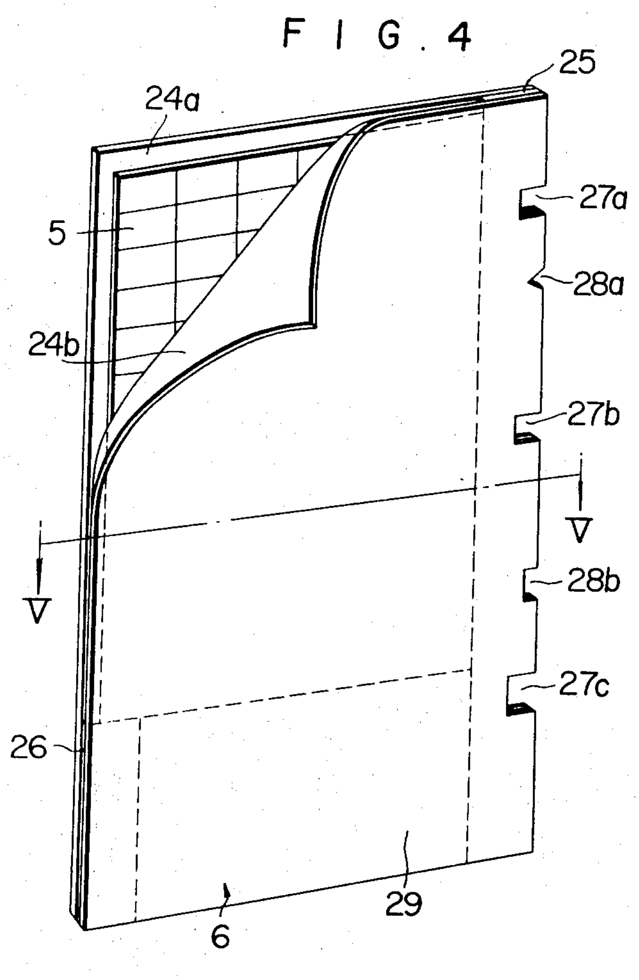
FIG. 4 is a perspective view of the jacket containing an information card.
Figure 5:
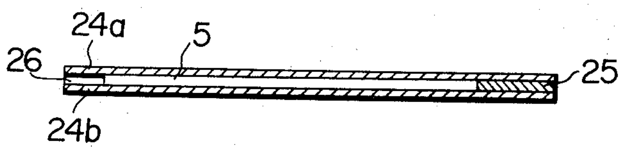
FIG. 5 is a diagram showing a section taken in line V — V in FIG. 4.

According to the present invention, the jacket 6 may preferably opened at a part of one of both sides. Therefore, the information card 5 can be easily inserted into the jacket 6 from the opened part of the jacket 6. Also, the information card is easily replaced since the information card 5 is exposed with the jacket 6 being opened at a part of one of both sides as shown in FIG. 4 when the jacket 6 is taken out of the magazine 7.

The information card 5 is used while being contained in the jacket 6 and therefore it is not scratched during the processes of putting it into or taking it out of the magazine 7, thus making it possible to obtain a clear image. Should a scratch develop on the jacket 6, it may be replaced without replacing the expensive information card 5 contained therein.

If information of different types or different combinations is wanted, the magazine 7 may be removed from the drum 8 and replaced by another magazine containing the required information cards. Each of the magazines 7 may contain jackets 6 with the same search codes and therefore the jackets 6 may be taken out of that magazine 7 whose address is designated, merely by changing the address designation of the magazines 7 without changing the search magnets **16*a* and 16*b*.** For this reason, a variety of combinations of information are obtained.

It will be apparent from the above description that the present invention has the following advantages over the conventional information card retrieval device. Namely, (1) a designated magazine can be moved to the position nearest to the selector means by rotating the drum clockwise or counterclockwise and therefore the time required for taking out a desired information card is shortened. (2) A desired jacket is taken out with the magazine and selector means stopped and therefore no scratches develop on the jacket. (3) It is sufficient if the search codes attached to the jackets are different only within a magazine, and therefore it is possible to reduce the number of digits of a search code, with the result that both the construction of the selector means and the process for forming notches on the jackets as search codes are simplified. (4) The drum, magazines, selector means and the holding plate can be operated with the output of the same logic, making it possible to simplify the interlocking system. (5) Since part of the jacket is always left within the magazine, the jacket can be returned into the magazine without any troublesome separation work after an enlarged image has been projected on the screen. (6) The fact that the jacket is partially left within the magazine permits speedly operation of retrieval and returning of the jacket. (7) Various indications identifiable with a naked eye can be conveniently given in blank portions of the jackets. (8) The use of jackets permits the information cards to be maintained new without any fear of scratches being developed, making it always possible to obtain a clear image. (9) The job of retrieval from and returning to the jacket of the information card is facilitated and therefore the job of replacing the information card is simplified.

Even though in the above-described embodiment the apertures in the small gear are utilized as the addresses of the magazines, marks provided directly on the drum or magazine may be alternatively detected.

We claim:

1. An information card retrieval device comprising a multiplicity of information cards each carrying picture information, a multiplicity of jackets each provided with a search code and containing one of said information cards, a plurality of magazines each for containing a plurality of such jackets, a drum for supporting said plurality of magazines in juxtaposition, a means for determining the search code for a desired jacket of said jackets, a selector means actuated by the operation of said determining means a detector means for detecting the addresses of said magazines on said drum to generate detection pulses, a counter means for counting said detection pulses, a register means for setting a desired address of the magazine addresses, a comparator means for comparing the content of said register means with that of said counter means, a driving means for rotating said drum upon instructions from said comparator means and moving a desired magazine of said magazines to said selector means, a means for retreating a jacket-holding means when said driving means stops, and a means for pulling out the jacket selected by said selector means from said desired magazine.

2. An information card retrieval device according to claim 1, in which said pulling out means comprises a means for pulling out the jacket selected by said selector means while leaving partially within said magazine.

3. An information card retrieval device according to claim 1, in which each of said jackets comprises a portion for containing the information card and a blank portion for making various descriptive indications.

4. An information card retrieval device according to claim 1, in which each of said jackets is opened at a part of one of both sides.

* * * * *